US011453766B2

(12) United States Patent
Delevati

(10) Patent No.: US 11,453,766 B2
(45) Date of Patent: Sep. 27, 2022

(54) EVA-CONTAINING COMPOSITIONS WITH IMPROVED MECHANICAL PROPERTIES AND ARTICLES AND METHODS THEREOF

(71) Applicant: Braskem S.A., Camaçari (BR)

(72) Inventor: Giancarlos Delevati, São Paulo (BR)

(73) Assignee: Braskem S.A., Camaçari (BR)

( * ) Notice: Subject to any disclaimer, the term of this patent is extended or adjusted under 35 U.S.C. 154(b) by 114 days.

(21) Appl. No.: 16/682,869

(22) Filed: Nov. 13, 2019

(65) Prior Publication Data

US 2021/0139681 A1    May 13, 2021

Related U.S. Application Data

(60) Provisional application No. 62/760,210, filed on Nov. 13, 2018.

(51) Int. Cl.
| | | |
|---|---|---|
| *C08L 23/08* | (2006.01) | |
| *C08L 23/12* | (2006.01) | |
| *C08L 23/14* | (2006.01) | |
| *C08L 83/04* | (2006.01) | |
| *C08K 5/00* | (2006.01) | |

(52) U.S. Cl.
CPC ....... *C08L 23/0853* (2013.01); *C08L 23/0815* (2013.01); *C08L 23/12* (2013.01); *C08L 23/14* (2013.01); *C08L 83/04* (2013.01); *C08K 5/0016* (2013.01)

(58) Field of Classification Search
CPC ...... C08L 23/0853; C08L 23/10; C08L 23/12; C08L 23/14
See application file for complete search history.

(56) References Cited

U.S. PATENT DOCUMENTS

| | | | | |
|---|---|---|---|---|
| 4,116,914 | A | * | 9/1978 | Coran ................. C08L 23/02 525/222 |
| 4,713,419 | A | | 12/1987 | Takimoto et al. |
| 8,541,502 | B2 | | 9/2013 | Martinez et al. |
| 2013/0095542 | A1 | | 4/2013 | Pereira et al. |

FOREIGN PATENT DOCUMENTS

| | | |
|---|---|---|
| BR | 102012025160 A2 | 11/2013 |
| EP | 0472512 A2 | 2/1992 |

OTHER PUBLICATIONS

Gupta, A. K. et al. Journal of Applied Polymer Science vol. 45 pp. 1303-1312 (Year: 1992).*
Kakkar, D. et al. Journal of Applied Polymer Science vol. 123 pp. 1905-1912 (Year: 2012).*
Jafari, S.H. et al. Journal of Applied Polymer Science vol. 78 pp. 926-971 (Year: 2000).*
Maier, C. et al. Polypropylene—The Definitive User's Guide and Databook William Andrew Publishing/Plastics Design Library, Norwich NY (Year: 1998).*
International Search Report issued in corresponding International Application No. PCT/IB2029/026292; dated Feb. 18, 2020 (3 pages).
Written Opinion of the International Searching Authority issued in corresponding International Application No. PCT IB2019/026292; dated Feb. 18, 2020 (5 pages).
International Preliminary Report on Patentability issued in corresponding International Application No. PCT/B2019/026292; dated May 27, 2021 (7 pages).

* cited by examiner

*Primary Examiner* — Irina S Zemel
*Assistant Examiner* — Jeffrey S Lenihan
(74) *Attorney, Agent, or Firm* — Osha Bergman Watanabe & Burton LLP

(57) ABSTRACT

Blended polymer compositions and methods of making the same include an elastomeric EVA composition in an amount ranging from about 46 to 70 wt % of the polymer composition; and a polypropylene in an amount ranging from about 20 to 40 wt % of the polymer composition. Methods include mixing an elastomeric EVA composition with polypropylene, and extruding the mixture of elastomeric EVA composition and polypropylene.

28 Claims, No Drawings

EVA-CONTAINING COMPOSITIONS WITH IMPROVED MECHANICAL PROPERTIES AND ARTICLES AND METHODS THEREOF

BACKGROUND

Commercial polymer compositions are used to produce a varied range of articles for many different applications. Such compositions may be formulated with a variety of rubbers and other additives to provide articles that possess physical properties well-suited for their intended use. For example, articles that are intended to be for the automotive market may possess, among others, enhanced physical and chemical properties that resemble those of traditional thermoplastic elastomer materials used in the industry. Blends or alloys of plastic and elastomeric rubber have been historically relevant in the production of high performance thermoplastic elastomers, particularly for the replacement of thermoset rubber in various applications.

Polyolefin copolymers such as ethylene vinyl acetate (EVA) may be used to manufacture a varied range of articles, including films, molded products, foams, and the like. In general, polyolefins are widely used plastics worldwide, given their versatility in a wide range of applications. While EVA may have characteristics such as high process-ability, low production cost, flexibility, low density and recycling possibility, physical and chemical properties such as tackiness and deformability may create difficulties during processing and may exhibit varied responses depending on a number of factors such as molecular weight, distribution of molecular weights, content and distribution of comonomer (or comonomers), method of processing, and the like.

Alternative materials of interest include thermoplastic polymer compositions derived from ethylene vinyl acetate (EVA) copolymers. Up to this point, EVA compositions, particularly those of low to medium vinyl acetate content, have not been heavily utilized for the manufacture of articles for the automotive industry. This is generally because such compositions tend to have a low hardness compared to the hardness required for use in such applications. Polymer compositions containing EVA can be thermoplastic in nature, and so they can be easily formed into articles.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to polymer compositions that include an elastomeric EVA composition in an amount ranging from about 46 to 70 wt % of the polymer composition; and a polypropylene in an amount ranging from about 20 to 40 wt % of the polymer composition.

In another aspect, embodiments disclosed herein relate to polymer compositions that include an elastomeric EVA composition; and a polypropylene, where the polymer composition has a Shore D Hardness according to ASTM D2240 that ranges from 25 to 54 Shore D; and a tensile modulus at 100% elongation according to ASTM D638 that ranges from 5 to 20 MPa.

In another aspect, embodiments disclosed herein relate to a thermoplastic article that includes a polymer composition that include an elastomeric EVA composition in an amount ranging from about 46 to 70 wt % of the polymer composition; and a polypropylene in an amount ranging from about 20 to 40 wt % of the polymer composition.

In another aspect, embodiments disclosed herein relate to a thermoplastic article that includes a polymer composition that include an elastomeric EVA composition; and a polypropylene, where the polymer composition has a Shore D Hardness according to ASTM D2240 that ranges from 25 to 54 Shore D; and a tensile modulus at 100% elongation according to ASTM D638 that ranges from 5 to 20 MPa.

In yet another aspect, embodiments disclosed herein relate to methods that include mixing an elastomeric EVA composition with polypropylene, and extruding the mixture of elastomeric EVA composition and polypropylene.

In yet another aspect, embodiments disclosed herein relate to molding a polymer composition that include an elastomeric EVA composition in an amount ranging from about 46 to 70 wt % of the polymer composition; and a polypropylene in an amount ranging from about 20 to 40 wt % of the polymer composition, to form an article.

In yet another aspect, embodiments disclosed herein relate to molding a polymer composition that include an elastomeric EVA composition; and a polypropylene, where the polymer composition has a Shore D Hardness according to ASTM D2240 that ranges from 25 to 54 Shore D; and a tensile modulus at 100% elongation according to ASTM D638 that ranges from 5 to 20 MPa, to form an article.

Other aspects and advantages of the claimed subject matter will be apparent from the following description and the appended claims.

DETAILED DESCRIPTION

Embodiments of the present disclosure are directed to the production of thermoplastic blended compositions that exhibit desired mechanical and chemical properties that include, but are not limited to, increased hardness, modified stiffness and tensile modulus, and enhanced thermal and chemical stability. In another aspect, embodiments of the present disclosure are directed to methods of the manufacture of blended polymer compositions, including blends containing elastomeric ethylene vinyl acetate (EVA) resin and a polypropylene, and articles thereof with enhanced mechanical properties.

Embodiments disclosed herein generally relate to compounded thermoplastic polymer compositions containing ethylene vinyl acetate (EVA) copolymers. One or more embodiments disclosed herein relate to polymer compositions that comprise EVA, and polypropylene. In particular, polymer compositions of the present disclosure may be used to form articles comprising EVA copolymer and polypropylene. Generally, EVA-derived materials do not exhibit the requisite physical properties, such as hardness, and chemical stability that would provide for its use in applications such as those found in the automotive market. However, the thermoplastic EVA compounded compositions, and articles therefrom, of one or more embodiments of the present disclosure possess superior properties to traditional materials. Such articles may possess thermoplastic and elastomeric properties, including increased hardness with appropriate tensile modulus and improved chemical properties for enhanced performance of articles thereof. Some embodiments are especially suited for use in high performance aerodynamic deflectors and air dams, in the automotive industry.

Thermoplastic EVA compounded compositions in accordance with the present disclosure may be generated in post-reactor processes. Polymer compositions may be prepared from a polypropylene with an elastomeric EVA composition in a post-reactor melt mixture process, including extruders and intensive mixers. By mixing components subsequent to synthesis in a reactor, each component isolated may be combined in controlled stoichiometry to generate polymer composition while minimizing the presence of reactants and degradation products. For multicomponent compositions, a subset of the components may be combined by melt mixing followed by subsequent mixing steps, or all components may be melt mixed simultaneously.

As mentioned, embodiments of the present disclosure are directed to polymer compositions containing polypropylene and an elastomeric EVA composition.

Polypropylene

Polymer compositions in accordance with the present disclosure may include polypropylene. In some embodiments, polypropylene may include propylene homopolymers, heterophasic propylene polymers, copolymers of propylene and one or more comonomers selected from ethylene and C4-C20 alpha-olefins, propylene terpolymers and higher order polymers, and blends obtained from the mixture of one or more of these polymers and/or copolymers. In some embodiments, polypropylene may be generated with a suitable catalyst such as Ziegler-Natta and metallocene catalysts.

In one or more embodiments, polymer compositions may include biobased and recycled polypropylene produced from propylene monomers, including polypropylene of varying molecular weight and density, and blends and mixtures thereof. In one or more embodiments, polymer compositions may include polypropylene homopolymers and/or polypropylene copolymers or mixtures thereof.

Thermoplastic EVA compounded compositions in accordance with the present disclosure may include a polypropylene at a percent by weight of the composition that ranges from a lower limit of about 20 wt % to an upper limit of about 40 wt %. In one or more embodiments, the lower limit may range from 20, 22, 24, 26, 28, or 30 wt %, and the upper limit may range from 30, 32, 34, 36, 38, 40 wt %, where any lower limit may be used in combination with any upper limit.

Polymer compositions may be formulated with polypropylene in specific to provide articles produced therefrom with the requisite physical properties for their intended use. For example, articles that are intended to be for the automotive market may exhibit, among others, the following characteristics: adequate hardness, impact strength, flexibility, tensile modulus, and additionally for specific applications, improved chemical properties.

In one or more embodiments thermoplastic EVA compounded compositions may be formulated with polypropylene wherein the polypropylene may have a melt flow index (MFI) at 230° C. and 2.16 kg as determined according to ASTM D1238 in a range having a lower limit of at least 3 g/10 min, to an upper of at most 45 g/10 min. In another embodiment the polypropylene that may have a melt flow index (MFI) at 230° C. and 2.16 kg as determined according to ASTM D1238 in a range having a lower limit of at least 4 g/10 min, to an upper of at most 40 g/10 min.

Biobased polypropylenes in accordance with the present disclosure may include polyolefins containing a weight percentage of biologically derived monomers. Propylene monomers may be derived from similar biological processes as discussed, for example, in U.S. Pat. Pub. 2013/0095542.

In one or more embodiments, biologically derived n-propanol may be dehydrated to yield propylene, which is then polymerized to produce various types of polypropylene. Biobased polypropylene in accordance with the present disclosure may include a homopolymer, random copolymer, heterophasic copolymer or terpolymer, and the like.

Biobased polypropylenes in accordance with the present disclosure may include a polypropylene having a biobased content at a percent by weight (wt %) in a range having a lower limit selected from any of 0.05 wt %, 0.1 wt %, 1 wt %, and 5 wt %, to an upper limit selected from any of 50%, 90%, and 100%, where any lower limit may be combined with any upper limit.

In one or more embodiments, biobased products obtained from natural materials may be certified as to their renewable carbon content, according to the methodology described in the technical standard ASTM D 6866-06, "Standard Test Methods for Determining the Biobased Content of Natural Range Materials Using Radiocarbon and Isotope Ratio Mass Spectrometry Analysis."

Thermoplastic EVA compounded composition in accordance with the present disclosure may include recycled polypropylenes obtained from various sources including post-industrial resins, post-consumer resins, regrind polymer resins, and combinations thereof. In one or more embodiments, recycled polypropylene may be obtained by a general process of selecting a polypropylene from a polypropylene waste residue, cleaning the polypropylene, and processing the polypropylene to generate polypropylene flakes. In some embodiments, processing to generate polypropylene flakes may occur before the cleaning step. In some embodiments, the recycling process further comprises the step of extruding the polypropylene flakes to generate polypropylene pellets.

Elastomeric Ethylene Vinyl Acetate Composition

Thermoplastic EVA compounded compositions in accordance to the present disclosure may include an elastomeric ethylene vinyl acetate (EVA) compositions prepared from (A) EVA copolymer, (B) ethylene alpha-olefin copolymer, (C) polyorganosiloxane, (D) plasticizer, and (E) rubber. Elastomeric EVA compositions are prepared as disclosed in the Brazilian patent BR102012025160-4, incorporated herein by reference in its entirety. The major components of the elastomeric EVA composition of the present disclosure as well as their respective properties are detailed below. In some embodiments, elastomeric EVA compositions may be VA4018R, SVT2145R, VA1518A, VA2510A, VA5018ALS or any other resin under the EVANCE™, and combinations thereof, which are commercially available by Braskem.

Thermoplastic EVA compounded compositions in accordance with the present disclosure may include an elastomeric EVA at a percent by weight of the composition that ranges from a lower limit selected from a lower limit of about 40 wt % to an upper limit of about 70 wt % of the thermoplastic EVA compounded composition. In one or more embodiments, the lower limit may range from 40, 42, 44, 46, 48, 50, or 55 wt %, and the upper limit may range from 60, 62, 64, 66, 68, 70 wt %, where any lower limit may be used in combination with any upper limit.

(A) EVA Copolymer

Elastomeric EVA compositions of the present invention may incorporate one or more ethylene-vinyl acetate (EVA) copolymers prepared by the copolymerization of ethylene and vinyl acetate. In some embodiments, the EVA copolymer can be derived from petroleum or renewable sources (such as biobased EVA). Biobased EVA is an EVA wherein at least one of ethylene and/or vinyl acetate monomers are derived from renewable sources, such as ethylene derived from biobased ethanol.

In one or more embodiments, EVA copolymers in accordance with the present disclosure may include a percent by weight (wt %) of vinyl acetate according to ASTM D5594 that ranges from a lower limit of about 2 wt % to an upper limit of about 50 wt % of the EVA copolymer. In some embodiments, the amount of vinyl acetate may be of the range 5-40 wt % of the EVA copolymer. In one or more embodiments, the lower limit may range from 2, 5, 8, 10, 12, 15, or 20 wt %, and the upper limit may range from 20, 25, 30, 35, 40, 45 or 50 wt % of the EVA copolymer, where any lower limit may be used in combination with any upper limit.

In some embodiments, EVA copolymers in accordance with the present disclosure may include a percent by weight of ethylene that ranges from a lower limit of about 50 wt % to an upper limit of about 98 wt % of the EVA copolymer.

Elastomeric EVA compositions in accordance with the present disclosure may contain an EVA copolymer at a percent by weight (wt %) of the elastomeric EVA composition that ranges from a lower limit of 20 wt %, 30 wt %, 40 wt % or 50 wt %, to an upper limit of 60 wt %, 70 wt %, 80 wt % or 90 wt %, where any lower limit may be paired with any upper limit.

(B) Ethylene Alpha-Olefin Copolymer

Elastomeric EVA compositions in accordance with the present disclosure may incorporate one or more ethylene alpha-olefin copolymers prepared from the polymerization of ethylene and one or more of a C3 to C20 alpha-olefin.

Ethylene alpha-olefin copolymer in accordance with the present disclosure may have a hardness determined in accordance with ASTM D2240 in a range having a lower limit selected from any of 10 Shore A, 15 Shore A, and 20 Shore A, to an upper limit selected from any of 70 Shore A, 75 Shore A, and 80 Shore A, where any lower limit may be paired with any upper limit.

Ethylene alpha-olefin copolymer in accordance with the present disclosure may have a density determined according to ASTM D792 in a range having a lower limit selected from any of 0.80 g/cm3, 0.85 g/cm3, and 0.88 g/cm3, to an upper limit selected from any of 0.89 g/cm3, 0.90 g/cm3, and 0.95 g/cm3, where any lower limit may be paired with any upper limit.

Ethylene alpha-olefin copolymer in accordance with the present disclosure may have a melt flow index (MFI) at 190° C. and 2.16 kg as determined according to ASTM D1238 in a range having a lower limit selected from any of 0.01 g/10 min, 0.05 g/10 min, and 0.1 g/10 min, to an upper limit selected from any of 70 g/10 min, 75 g/10 min, and 100 g/10 min, where any lower limit may be paired with any upper limit.

Elastomeric EVA compositions in accordance with the present disclosure may contain an ethylene alpha-olefin copolymer at a percent by weight (wt %) of the composition that ranges from a lower limit of 5 wt % or 10 wt %, to an upper limit of 30 wt % or 60 wt %, where any lower limit may be paired with any upper limit.

(C) Polyorganosiloxane

Elastomeric EVA compositions in accordance with the present disclosure may incorporate a polyorganosiloxane. In one or more embodiments, suitable polyorganosiloxanes include a linear chain, branched, or three-dimensional structure, wherein the side groups can include one or more of methyl, ethyl, propyl groups, vinyl, phenyl, hydrogen, amino, epoxy, or halogen substituents. The terminal groups of the polyorganosiloxane may include hydroxyl groups, alkoxy groups, trimethylsilyl, dimethyldiphenylsilyl, and the like. Polyorganosiloxanes in accordance with the present disclosure may include one or more of dimethylpolysiloxane, methylpolysiloxane, and the like.

Elastomeric EVA compositions in accordance with the present disclosure may contain a polyorganosiloxane having a viscosity measured at 25° C. according to ASTM D4287 that ranges from a lower limit of 20 cP or 40 cP, to an upper limit of 700,000 cP or 900,000 cP, where any lower limit may be paired with any upper limit.

Elastomeric EVA compositions in accordance with the present disclosure may contain a polyorganosiloxane at a percent by weight (wt %) of the elastomeric EVA composition that ranges from a lower limit of 0.1 wt % or 0.5 wt %, to an upper limit of 5 wt % or 10 wt %, where any lower limit may be paired with any upper limit

(D) Plasticizer

Elastomeric EVA compositions in accordance with the present disclosure may incorporate a plasticizer to improve the process-ability and adjust the hardness of the elastomeric EVA composition. Plasticizers in accordance with the present disclosure may include one or more of bis(2-ethylhexyl) phthalate (DEHP), di-isononyl phthalate (DINP), bis (n-butyl) phthalate (DNBP), butyl benzyl phthalate (BZP), di-isodecyl phthalate (DIDP), di-n-octyl phthalate (DOP or DNOP), di-o-octyl phthalate (DIOP), diethyl phthalate (DEP), di-isobutyl phthalate (DIBP), di-n-hexyl phthalate, tri-methyl trimellitate (TMTM), tri-(2-ethylhexyl) trimellitate (TEHTM-MG), tri-(n-octyl, n-decyl) trimellitate, tri-(heptyl, nonyl) trimellitate, n-octyl trimellitate, bis (2-ethylhexyl) adipate (DEHA), dimethyl adipate (DMD), monomethyl adipate (MMAD), dioctyl adipate (DOA)), dibutyl sebacate (DBS), polyesters of adipic acid such as VIERNOL, dibutyl maleate (DBM), di-isobutyl maleate (DIBM), benzoates, epoxidized soybean oils, n-ethyl toluene sulfonamide, n-(2-hydroxypropyl) benzene sulfonamide, n-(n-butyl) benzene sulfonamide, tricresyl phosphate (TCP), tributyl phosphate (TBP), glycols/polyesters, triethylene glycol dihexanoate, 3 gh), tetraethylene glycol di-heptanoate, polybutene, acetylated monoglycerides; alkyl citrates, triethyl citrate (TEC), acetyl triethyl citrate, tributyl citrate, acetyl tributyl citrate, trioctyl citrate, acetyl trioctyl citrate, trihexyl citrate, acetyl trihexyl citrate, butyryl trihexyl citrate, trihexyl o-butyryl citrate, trimethyl citrate, alkyl sulfonic acid phenyl ester, 2-cyclohexane dicarboxylic acid di-isononyl ester, nitroglycerin, butanetriol trinitrate, dinitrotoluene, trimethylolethane trinitrate, diethylene glycol dinitrate, triethylene glycol dinitrate, bis (2,2-dinitropropyl) formal, bis (2,2-dinitropropyl) acetal, 2,2,2-trinitroethyl 2-nitroxyethyl ether, mineral oils, among other plasticizers and polymeric plasticizers.

Elastomeric EVA compositions in accordance with the present disclosure may contain a plasticizer at a percent by weight (wt %) of the composition that ranges from a lower limit of 0.5 wt % or 2 wt %, to an upper limit of 10 wt % or 20 wt %, where any lower limit may be paired with any upper limit.

(E) Rubber

Elastomeric EVA compositions in accordance with the present disclosure may incorporate a rubber component to increase the rubbery touch and increase the coefficient of friction, depending on the end application. Rubbers in accordance with the present disclosure may include one or more of natural rubber, poly-isoprene (IR), styrene and butadiene rubber (SBR), polybutadiene, nitrile rubber (NBR); polyolefin rubbers such as ethylene-propylene rubbers (EPDM, EPM), and the like, acrylic rubbers, halogen rubbers such as halogenated butyl rubbers including brominated butyl rubber and chlorinated butyl rubber, brominated isotubylene, polychloroprene, and the like; silicone rubbers such as methylvinyl silicone rubber, dimethyl silicone rubber, and the like, sulfur-containing rubbers such as polysulfidic rubber; fluorinated rubbers; thermoplastic rubbers such as elastomers based on styrene, butadiene, isoprene, ethylene and propylene, styrene-isoprene-styrene (SIS), styrene-ethylene-butylene-styrene (SEBS), styrene-butylene-styrene (SBS), and the like, ester-based elastomers, elastomeric polyurethane, elastomeric polyamide, and the like.

Rubbers in accordance with the present disclosure may have a hardness determined in accordance with ASTM D2240 in a range having a lower limit selected from any of 10 Shore A, 15 Shore A, and 20 Shore A, to an upper limit selected from any of 45 Shore A, 50 Shore A, and 55 Shore A, where any lower limit may be paired with any upper limit.

Elastomeric EVA compositions in accordance with the present disclosure may contain a rubber at a percent by weight (wt %) of the composition that ranges from a lower limit of 0.5 wt % or 1 wt %, to an upper limit of 20 wt % or 40 wt %, where any lower limit may be paired with any upper limit.

Thermoplastic EVA Compounded Compositions

In one or more embodiments, thermoplastic EVA compounded compositions in accordance with the present disclosure may include Elastomeric EVA compositions prepared as described above, and polypropylene, along with additives such as fillers, antioxidants, slip agents, carbon black, anti-uv additives, and plasticizers.

Additives

In one or more embodiments, the thermoplastic EVA compounded compositions of the present disclosure may contain a number of other functional additives that modify various properties of the composition when added to the polymer composition during blending that include one or more polymer additives such as antioxidants, anti-UV additives, pigments, fillers, reinforcements, adhesion-promoting agents, biocides, whitening agents, nucleating agents, slip agents such as zinc stearate, anti-statics, anti-blocking agents, processing aids, flame-retardants, plasticizers, light stabilizers, and the like. In one or more embodiments, thermoplastic EVA compounded compositions may contain a percent by weight of the total composition (wt %) of one or more additives, listed above, ranging from a lower limit of 0.1 wt % to and upper limit of 15 wt %.

Thermoplastic EVA compounded compositions in accordance with the present disclosure may include anti-UV additives such as benzophenones, benzotriazoles, hindered amines, or carbon black. Thermoplastic EVA compounded compositions in accordance with the present disclosure may include a percent by weight of the total composition (wt %) of an anti-UV additive ranging from a lower limit of 0.5, 1, 1.5 wt % to an upper limit of 2.5, 3, 3.5 wt % or 10 wt %, where any lower limit may be combined with any upper limit.

Thermoplastic EVA compounded compositions in accordance with the present disclosure may include one or more antioxidants such as phenolic and phosphitic antioxidants. Thermoplastic EVA compounded compositions in accordance with one or more embodiments of the present disclosure may include an antioxidant at a percent by weight (wt %) of the composition that ranges from a lower limit of 0.1 wt % or 0.15 wt %, to an upper limit of 0.25 wt % or 0.3 wt %, where any lower limit may be paired with any upper limit.

Thermoplastic EVA compounded compositions in accordance with the present disclosure may include one or more slip agents including long chain fatty acid amides or metal salts of a fatty acid such as metallic stearates (including zinc stearate and calcium stearate, for example) to provide for improved performance at higher temperatures, improved reliability and reduced coefficient of friction. Thermoplastic EVA compounded compositions in accordance with one or more embodiments of the present disclosure may include a slip agent at a percent by weight (wt %) of the composition that ranges from a lower limit of 0.05 wt %, 0.1 wt %, or 0.15 wt % to an upper limit of 0.75 wt %, 0.8 wt %, 0.85 wt % and 1 wt % where any lower limit may be paired with any upper limit.

Thermoplastic EVA compounded compositions in accordance with the present disclosure may include one or more inorganic fillers such as talc, glass fibers, marble dust, cement dust, clay, carbon black, feldspar, silica or glass, fumed silica, silicates, calcium silicate, silicic acid powder, glass microspheres, mica, metal oxide particles and nanoparticles such as magnesium oxide, antimony oxide, zinc oxide, inorganic salt particles and nanoparticles such as barium sulfate, wollastonite, alumina, aluminum silicate, titanium oxides, calcium carbonate, polyhedral oligomeric silsesquioxane (POSS). In one or more embodiments, thermoplastic EVA compounded compositions may contain an amount of filler ranging from a lower limit of any of 5, 6, or 8 wt % to an upper limit of any of 8, 10, or 12 wt %, where any lower limit may be used in combination with any upper limit. Further, in some instances, it is envisioned that a component such as carbon black may be selected for use as both a filler and an anti-UV agent. If a different filler is used that does not have the same anti-UV effect as carbon black, it is understood that it also may be desirable to incorporate one or more of the anti-UV additives described above.

Thermoplastic EVA compounded compositions in accordance with one or more embodiments of the present disclosure may incorporate a plasticizer to improve the processability and adjust the hardness of the composition. Plasticizers in accordance with the present disclosure may include one or more of bis(2-ethylhexyl) phthalate (DEHP), di-isononyl phthalate (DINP), bis (n-butyl) phthalate (DNBP), butyl benzyl phthalate (BZP), di-isodecyl phthalate (DIDP), di-n-octyl phthalate (DOP or DNOP), di-o-octyl phthalate (DIOP), diethyl phthalate (DEP), di-isobutyl phthalate (DIBP), di-n-hexyl phthalate, tri-methyl trimellitate (TMTM), tri-(2-ethylhexyl) trimellitate (TEHTM-MG), tri-(n-octyl, n-decyl) trimellitate, tri-(heptyl, nonyl) trimellitate, n-octyl trimellitate, bis (2-ethylhexyl) adipate (DEHA), dimethyl adipate (DMD), mono-methyl adipate (MMAD), dioctyl adipate (DOA)), dibutyl sebacate (DBS), polyesters of adipic acid such as VIERNOL, dibutyl maleate (DBM), di-isobutyl maleate (DIBM), benzoates, epoxidized soybean oils, n-ethyl toluene sulfonamide, n-(2-hydroxypropyl) benzene sulfonamide, n-(n-butyl) benzene sulfonamide, tricresyl phosphate (TCP), tributyl phosphate (TBP), glycols/polyesters, triethylene glycol dihexanoate, 3 gh), tetraethylene glycol di-heptanoate, polybutene, acetylated monoglycerides; alkyl citrates, triethyl citrate (TEC), acetyl triethyl citrate, tributyl citrate, acetyl tributyl citrate, trioctyl citrate, acetyl trioctyl citrate, trihexyl citrate, acetyl trihexyl citrate, butyryl trihexyl citrate, trihexyl o-butyryl citrate, trimethyl citrate, alkyl sulfonic acid phenyl ester, 2-cyclohexane dicarboxylic acid di-isononyl ester, nitroglycerin, butanetriol trinitrate, dinitrotoluene, trimethylolethane trinitrate, diethylene glycol dinitrate, triethylene glycol dinitrate, bis (2,2-dinitropropyl) formal, bis (2,2-dinitropropyl) acetal, 2,2,2-trinitroethyl 2-nitroxyethyl ether, mineral oils, among other plasticizers and polymeric plasticizers.

Thermoplastic EVA compounded compositions in accordance with one or more embodiments of the present disclosure may contain a plasticizer at a percent by weight (wt %) of the composition that ranges from a lower limit of 0.1 wt %, 0.5 wt % or 2 wt %, to an upper limit of 5 wt %, 7 wt % or 10 wt %, where any lower limit may be paired with any upper limit.

Polymer Composition Preparation Methods

Thermoplastic EVA compounded compositions in accordance with the present disclosure may be prepared by a number of possible polymer blending and formulation techniques, which will be discussed in the following sections.

In one or more embodiments, polymer compositions in accordance with the present disclosure may be combined using any post-reactor melt mixture process, including kneaders, Banbury mixers, mixing rollers, extrusion processes with a single, double, or multi-screw extruder. By mixing components subsequent to synthesis, each component may be purified to specified standards and then combined to generate the final composition while minimizing the presence of reactants and degradation products. In embodiments prepared from multiple components, a subset of the components may be combined by melt mixing followed by subsequent mixing steps, or all components may be melt mixed simultaneously. For instance, the components to prepare the elastomeric EVA composition may be mixed with the polypropylene and the additives in a single mixture step. In other embodiment, the elastomeric EVA composition may be prepared in a prior step and subsequently may be mixed with the polypropylene and the additives to form the thermoplastic EVA compounded composition of the present disclosure.

In some embodiments, raw materials may be added to a melt mixture device such as kneaders, banburys, or extruders in the form of powder, granules, flakes or dispersion in liquids as solutions, emulsions and suspensions of one or more components.

In one or more embodiments, the polymer composition is combined with a secondary polymer composition in a melt blend process. In one or more other embodiments, the polymer composition is combined with a secondary polymer composition in a dry blend process.

Physical Properties of Thermoplastic EVA Compounded Composition

The properties of an article formed according to the present disclosure will generally be suitable for the articles intended use. One of ordinary skill in the art will, with the benefit of this present disclosure, appreciate that altering the relative amounts and/or identities of the components of a polymer composition will influence the properties of an article formed therefrom.

Thermoplastic EVA compounded compositions in accordance with the present disclosure may have a hardness as determined in accordance with ASTM D2240 in a range having a lower limit selected from any of 70 Shore A, 80 Shore A and 85 Shore A, to an upper limit selected from any of 90 Shore A, 95 Shore A and 100 Shore A, where any lower limit may be paired with any upper limit.

Thermoplastic EVA compounded compositions in accordance with the present disclosure may have a hardness as determined in accordance with ASTM D2240 in a range having a lower limit selected from any of 25 Shore D, 29 Shore D and 35 Shore D to an upper limit selected from any of 40 Shore D, 46 Shore D, and 54 Shore D, where any lower limit may be paired with any upper limit.

Thermoplastic EVA compounded compositions in accordance with the present disclosure may have a melt flow index (MFI) at 190° C. and 2.16 kg as determined according to ASTM D1238 in a range having a lower limit selected from any one of 2, 3, 4, and 5 g/10 min, to an upper limit selected from any one of 9, 10, 11, and 12 g/10 min, where any lower limit may be combined with any upper limit.

Thermoplastic EVA compounded compositions in accordance with the present disclosure may have a melt flow index (MFI) at 190° C. and 5 kg as determined according to ASTM D1238 in a range having a lower limit selected from any one of 20, 22, and 30 g/10 min to an upper limit selected from any one of 28, 35, 40, 48 g/10 min and 60 g/10 min where any lower limit may be combined with any upper limit.

Thermoplastic EVA compounded compositions in accordance with the present disclosure may have a density as determined according to ASTM D792 in a range having a lower limit selected from any one of 0.95, 0.98, or 0.99 g/cm$^3$, to an upper limit selected from any one of 1.1, 1.2, and 1.25 g/cm$^3$, where any lower limit may be combined with any upper limit.

Thermoplastic EVA compounded compositions in accordance with the present disclosure may have a Tensile Modulus at 100% elongation as determined according to ASTM D638 in a range having a lower limit selected from any one of 5, 8 or 10 MPa, to an upper limit selected from any one of 15, 18 or 20 MPa, where any lower limit may be combined with any upper limit.

Thermoplastic EVA compounded compositions in accordance with the present disclosure may have a Tensile Modulus at 300% elongation determined according to ASTM D638 in a range having a lower limit selected from any one of 3, 5.5 or 7 MPa, to an upper limit selected from any one of 9, 10 or 12 MPa, where any lower limit may be combined with any upper limit.

Thermoplastic EVA compounded compositions in accordance with the present disclosure may have a Tensile Strength at Break as determined according to ASTM D638 in a range having a lower limit selected from any one of 5, 7 or 9 MPa, to an upper limit selected from any one of 10, 15 or 21 MPa, where any lower limit may be combined with any upper limit.

Thermoplastic EVA compounded compositions in accordance with the present disclosure may have a Tensile Elongation at Break (1% Secant) as determined according to ASTM D638 in a range having a lower limit selected from any one of 300%, 500% or 600%, to an upper limit selected from any one of 800%, 1000% or 1400%, where any lower limit may be combined with any upper.

Methods of Forming Articles

In one or more embodiments, articles in accordance with the present disclosure are formed by processing of the thermoplastic EVA compounded composition as disclosed herein in in any conventional plastic molding process such as injection molding, compression molding, rotomolding, thermoforming, extrusion molding and the like.

In one or more embodiments, the article is an injection molded article, a thermoformed article, a foam, a compressed article, a coextruded article, a laminated article, a rotomolded article, an extruded article, monolayer articles, multilayer articles, and the like. In embodiments of a multilayer article, it is envisioned that at least one of the layers comprises the polymer composition of the present disclosure.

Applications

In one or more embodiments, thermoplastic EVA compounded composition may be used in the manufacturing of articles, particularly including automotive parts such as aerodynamic deflectors, air dams, door panels, instrument panels, trim parts, bumpers, steering systems, hoses, gaskets, and foams. Further examples of articles that may be produced using polymer compositions in accordance with the present disclosure include injected articles and parts, foams, expanded articles, thermoformed articles, domestic utilities, technical parts, air ducts, cushion garnish and back frames, masterbatches, and the like.

Examples

The following examples are merely illustrative, and should not be interpreted as limiting the scope of the present disclosure.

Example 1

In this example, polymer formulations are prepared in accordance with the present disclosure from a mixture of an elastomeric EVA composition VA4018R and polypropylene homopolymer PP H301, both commercially available resins by Braskem. Formulations are shown below in Table 1, while assayed physical properties are shown below in Table 2.

TABLE 1

Example Compositions

| Material | Example 1 (wt %) |
|---|---|
| EVA (VA4018R) | 54.7 |
| PP (H301) | 29.4 |
| Slip Agent (Zinc Stearate) | 0.4 |
| Plasticizer (mineral oil EMCA ® 380) | 0.5 |
| Calcium carbonate | 8.4 |
| Antioxidant (Irganox 1076) | 0.2 |
| Carbon Black (MONARCH ® 570) | 6.3 |

Some of the physical properties of the example articles were tested by standard methods. The results are compiled in Table 2.

TABLE 2

Physical Properties of Formulation 1

| Properties | Standard | Formulation 1 |
|---|---|---|
| Density | ASTM D792 | 0.99 g/cm$^3$ |
| Hardness | ASTM D2240 | 92 Shore A |
| Hardness | ASTM D2240 | 41 Shore D |
| MFI | ASTM D1238 at 190° C./2.16 kg | 6 g/10 min |
| MFI | ASTM D1238 at 190° C./5 kg | 24.4 g/10 min |
| Tensile Modulus at 100% | ASTM D638 | 7.5 MPa |
| Tensile Modulus at 300% | ASTM D638 | 7.8 MPa |
| Tensile Strength at Break | ASTM D638 | 9.3 MPa |
| % Elongation at Break | ASTM D638 | 687% |

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A polymer composition, comprising:
    an elastomeric EVA composition in an amount ranging from about 46 to 70 wt % of the polymer composition; and
    a polypropylene in an amount ranging from about 20 to 40 wt % of the polymer composition;
    wherein the elastomeric EVA composition comprises an ethylene vinyl acetate, an ethylene alpha-olefin copolymer, a rubber, a plasticizer, and a polyorganosiloxane; and
    wherein the polypropylene has a melt flow index according to ASTM D1238 at 230° C. and 2.16 kg that ranges from 3 to 45 g/10 min.

2. The polymer composition of claim 1, wherein the ethylene vinyl acetate has a vinyl acetate content according to ASTM D5594 that is less than about 50 wt %.

3. The polymer composition of claim 1, wherein the polypropylene is selected from a propylene homopolymer, a propylene random copolymer or a heterophasic propylene copolymer.

4. The polymer composition of claim 1, further comprising: at least one antioxidant at an amount ranging from about 0.1 to 0.3 wt % of the polymer composition.

5. The polymer composition of claim 1, further comprising: at least one slip agent at an amount ranging from about 0.05 to 1 wt % of the polymer composition.

6. The polymer composition of claim 1, further comprising: carbon black at an amount ranging from about 5 to 12 wt % of the polymer composition.

7. The polymer composition of claim 1, further comprising: at least one anti-UV additive at an amount ranging from about 0.5 to 10 wt % of the polymer composition.

8. The polymer composition of claim 1, further comprising: at least one plasticizer at an amount ranging from about 0.1 to 10 wt % of the polymer composition.

9. The polymer composition of claim 1, wherein the polymer composition has a Shore A Hardness according to ASTM D2240 ranging from 70 to 100 Shore A.

10. The polymer composition of claim 1, wherein the polymer composition has a Shore D Hardness according to ASTM D2240 that ranges from 25 to 54 Shore D.

11. The polymer composition of claim 1, wherein the polymer composition has a density according to ASTM D792 that ranges from 0.95 to 1.25 g/cm$^3$.

12. The polymer composition of claim 1, wherein the polymer composition has a melt flow index according to ASTM D1238 at 190° C./2.16 kg that ranges from 2 to 12 g/10 min.

13. The polymer composition of claim 1, wherein the polymer composition has a melt flow index according to ASTM D1238 at 190° C./5 kg that ranges from 20 to 60 g/10 min.

14. The polymer composition of claim 1, wherein the polymer composition has a tensile modulus at 100% elongation according to ASTM D638 that ranges from 5 to 20 MPa.

15. The polymer composition of claim 1, wherein the polymer composition has a tensile modulus at 300% elongation according to ASTM D638 that ranges from 3 to 12 MPa.

16. The polymer composition of claim 1, wherein the polymer composition has a tensile strength at break according to ASTM D638 that ranges from 5 to 21 MPa.

17. The polymer composition of claim 1, wherein the polymer composition has a tensile elongation at break (1% secant) according to ASTM D638 that ranges from 300 to 1400%.

18. A polymer composition, comprising: an elastomeric EVA composition; and a polypropylene,
wherein the elastomeric EVA composition comprises an ethylene vinyl acetate, an ethylene alpha-olefin copolymer, a rubber, a plasticizer, and a polyorganosiloxane;
wherein the polypropylene has a melt flow index according to ASTM D1238 at 230° C. and 2.16 kg that ranges from 3 to 45 g/10 min;
wherein the polymer composition has a Shore D Hardness according to ASTM D2240 that ranges from 25 to 54 Shore D; and a tensile modulus at 100% elongation according to ASTM D638 that ranges from 5 to 20 MPa.

19. A thermoplastic article comprising a polymer composition comprising:
an elastomeric EVA in an amount ranging from about 46 to 70 wt % of the polymer composition; and
a polypropylene in an amount ranging from about 20 to 40 wt % of the polymer composition,
wherein the elastomeric EVA composition comprises an ethylene vinyl acetate, an ethylene alpha-olefin copolymer, a rubber, a plasticizer, and a polyorganosiloxane.

20. The thermoplastic article of claim 19, wherein the thermoplastic article is an automotive part.

21. The thermoplastic article claim 20, wherein the automotive part is selected from the group consisting of aerodynamic deflectors, air dams, door panels, instrument panels, trim parts, bumpers, steering systems, hoses, gaskets, and foams.

22. A method, comprising:
mixing an elastomeric EVA composition with polypropylene, and extruding the mixture of elastomeric EVA composition and polypropylene;
wherein the elastomeric EVA composition comprises an ethylene vinyl acetate, an ethylene alpha-olefin copolymer, a rubber, a plasticizer, and a polyorganosiloxane; and
wherein the polypropylene has a melt flow index according to ASTM D1238 at 230° C. and 2.16 kg that ranges from 3 to 45 g/10 min.

23. The method of claim 22, wherein the elastomeric EVA composition comprises and ethylene vinyl acetate copolymer, an ethylene alpha-olefin copolymer, a rubber, a plasticizer, and a polyorganosiloxane.

24. The method of claim 23, further comprising:
preparing the elastomeric EVA composition prior to the mixing.

25. The method of claim 23, wherein the ethylene vinyl acetate copolymer, the ethylene alpha-olefin copolymer, the rubber, the plasticizer, and the polyorganosiloxane are mixed simultaneously with the mixing of the polypropylene copolymer.

26. A method, comprising:
molding the polymer composition of claim 1 to form an article.

27. The method of claim 26, wherein the molding comprises injection molding, compression molding, or rotomolding.

28. A method, comprising:
molding the polymer composition of claim 18 to form an article.

* * * * *